(12) United States Patent
Zeng et al.

(10) Patent No.: US 11,659,170 B2
(45) Date of Patent: May 23, 2023

(54) SYSTEMS AND METHODS FOR INTRA PREDICTION

(71) Applicant: ZHEJIANG DAHUA TECHNOLOGY CO., LTD., Zhejiang (CN)

(72) Inventors: Feiyang Zeng, Hangzhou (CN); Jucai Lin, Hangzhou (CN); Jun Yin, Hangzhou (CN); Dong Jiang, Hangzhou (CN); Cheng Fang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 30 days.

(21) Appl. No.: 17/349,844

(22) Filed: Jun. 16, 2021

(65) Prior Publication Data
US 2021/0314564 A1 Oct. 7, 2021

Related U.S. Application Data

(63) Continuation of application No. PCT/CN2019/126515, filed on Dec. 19, 2019.

(30) Foreign Application Priority Data

Dec. 29, 2018 (CN) .......................... 201811642987.1
Mar. 12, 2019 (CN) .......................... 201910185729.3

(51) Int. Cl.
*H04N 19/11* (2014.01)
*H04N 19/186* (2014.01)
(Continued)

(52) U.S. Cl.
CPC ........... *H04N 19/11* (2014.11); *H04N 19/132* (2014.11); *H04N 19/176* (2014.11); *H04N 19/186* (2014.11); *H04N 19/593* (2014.11)

(58) Field of Classification Search
CPC .... H04N 19/11; H04N 19/176; H04N 19/132; H04N 19/593; H04N 19/186
See application file for complete search history.

(56) References Cited

U.S. PATENT DOCUMENTS 9,282,341 B2 * 3/2016 Kim .................... H04N 19/593
2015/0117532 A1 4/2015 Min et al.
(Continued)

FOREIGN PATENT DOCUMENTS

CN 102857768 A 1/2013
CN 103338371 A 10/2013
(Continued)

OTHER PUBLICATIONS

International Search Report in PCT/CN2019/126515 dated Mar. 19, 2020, 6 pages.
(Continued)

*Primary Examiner* — Tsion B Owens
(74) *Attorney, Agent, or Firm* — Metis IP LLC

(57) ABSTRACT

The present disclosure relates to systems and methods for intra prediction. The methods may include obtaining a current chroma block; obtaining a plurality of luma prediction modes, wherein the plurality of luma prediction modes includes prediction modes at a plurality of positions of a luma block associated with the current chroma block; and selecting a luma prediction mode from the plurality of luma prediction modes as a candidate chroma prediction mode for predicting samples of the current chroma block.

19 Claims, 13 Drawing Sheets

(51) Int. Cl.
*H04N 19/132* (2014.01)
*H04N 19/176* (2014.01)
*H04N 19/593* (2014.01)

(56) References Cited

U.S. PATENT DOCUMENTS

| | | | |
|---|---|---|---|
| 2017/0272748 A1 | 9/2017 | Seregin et al. | |
| 2017/0332084 A1* | 11/2017 | Seregin | H04N 1/417 |
| 2018/0063553 A1 | 3/2018 | Zhang et al. | |
| 2019/0313130 A1* | 10/2019 | Zhang | H04N 19/70 |
| 2021/0385467 A1* | 12/2021 | Chuang | H04N 19/196 |

FOREIGN PATENT DOCUMENTS

| | | | |
|---|---|---|---|
| CN | 106162175 A | 11/2016 | |
| CN | 109005408 A | 12/2018 | |
| CN | 109451306 A | 3/2019 | |
| CN | 109862353 A | 6/2019 | |
| CN | 110087083 A | 8/2019 | |
| KR | 20180075422 A | 7/2018 | |
| WO | 2018035130 A1 | 2/2018 | |
| WO | 2018064948 A1 | 4/2018 | |

OTHER PUBLICATIONS

Written Opinion in PCT/CN2019/126515 dated Mar. 19, 2020, 6 pages.
Zhang, Li et al., CE3-related: Modified Chroma Derived Mode, Joint Video Experts Team (JVET) of ITU-T SG 16 WP 3 and ISO/IEC JTC 1/SC 29/WG 11—12th Meeting: Macao, 2018, 4 pages.
Yau, Chang-Hao et al., CE3-related: Simplification of MDMS Derivation, Joint Video Experts Team (JVET) of ITU-T SG 16 WP 3 and ISO/IEC JTC 1/SC 29/WG 11—12th Meeting: Macao, 2018, 4 pages.
Zeng, Feiyang et al., Non-CE3: Modified Chroma Derived Mode, Joint Video Experts Team (JVET) of ITU-T SG 16 WP 3 and ISO/IEC JTC 1/SC 29/WG 11—13th Meeting: Marrakech, 2019, 3 pages.
Zeng, Feiyang et al., CE3-related: Modified Chroma Derived Mode, Joint Video Experts Team (JVET) of ITU-T SG 16 WP 3 and ISO/IEC JTC 1/SC 29/WG 11—14th Meeting: Geneva, 2019, 3 pages.
The Extended European Search Report in European Application No. 19902107.2 dated Feb. 11, 2022, 12 pages.
Zhang, Li et al., Multiple Direct Mode for Intra Coding, 2017 IEEE Visual Communications and Image Processing (VCIP), 2017, 4 pages.

* cited by examiner

1100

- 1110: Obtaining a plurality of luma prediction modes, wherein the plurality of luma prediction modes are prediction modes at a plurality of positions of a luma block associated with the current chroma block
- 1120: Selecting one or more alternative modes from the plurality of luma prediction modes
- 1130: Replacing one or more candidate chroma prediction modes in the candidate list with the one or more alternative modes

FIG. 11

SYSTEMS AND METHODS FOR INTRA PREDICTION

CROSS-REFERENCE TO RELATED APPLICATIONS

This application is a Continuation of International Application No. PCT/CN2019/126515, filed on Dec. 19, 2019, which claims priority of Chinese Application No. 201811642987.1, filed on Dec. 29, 2018, and Chinese Application No. 201910185729.3, filed on Mar. 12, 2019, the contents of each of which are incorporated herein by reference.

TECHNICAL FIELD

The present disclosure generally relates to systems and methods for image processing, and more particularly, to systems and methods for intra prediction.

BACKGROUND

Videos are usually encoded and compressed before transmission or storage. However, due to hardware and other constraints, such as limited storage space and limited transmission bandwidths, a compressed size of a video is preferred to be as small as possible. The compressed size of the video has correlations with a prediction mode selected for predicting intra samples and residual errors caused by the prediction mode. Thus, it is desirable to provide systems and methods for intra prediction, especially for selecting a best prediction mode, to make the compressed size of the video small and make a prediction chroma accurate.

SUMMARY

An aspect of the present disclosure introduces a system for intra prediction. The system may include at least one storage medium including a set of instructions for intra prediction, and at least one processor in communication with the storage medium. When executing the set of instructions, the at least one processor may perform the operations including: obtaining a current chroma block; obtaining a plurality of luma prediction modes, wherein the plurality of luma prediction modes includes prediction modes at a plurality of positions of a luma block associated with the current chroma block; and selecting a luma prediction mode from the plurality of luma prediction modes as a candidate chroma prediction mode for predicting samples of the current chroma block.

In some embodiments, the candidate chroma prediction mode is a derived mode (DM).

In some embodiments, the selecting the luma prediction mode from the plurality of luma prediction modes as the candidate chroma prediction mode includes: determining a count for each type of luma prediction modes of the plurality of luma prediction modes; and determining the candidate chroma prediction mode based on the count of luma prediction modes of each type.

In some embodiments, the at least one processor is further directed to perform operations including: determining a maximum count of a type of luma prediction modes among the plurality of luma prediction modes; determining whether the maximum count is greater than a first count threshold; and in response to a determination that the maximum count is greater than the first count threshold, determining the type of luma prediction modes having the maximum count as the candidate chroma prediction mode.

In some embodiments, the at least one processor is further directed to perform operations including: in response to a determination that the maximum count is not greater than the first count threshold, determining a luma prediction mode at a center of the luma block as the candidate chroma prediction mode.

In some embodiments, the at least one processor is further directed to perform operations including: assigning a weight for a luma prediction mode at each position of the plurality of positions; determining a weight sum of each type of luma prediction modes based on the weight of the luma prediction mode at each position and the count of luma prediction modes of each type; and determining the candidate chroma prediction mode based on the weight sum of each type of luma prediction modes.

In some embodiments, the weight of the luma prediction mode at a position has a correlation with a distance between the position and a center of the luma block.

In some embodiments, the correlation is a negative correlation.

In some embodiments, the plurality of positions of the luma block include at least two of: a center of the luma block, a corner point of the luma block, or a center point of a sub-block, wherein the center point of the luma block and the corner point of the luma block are two corner points of the sub-block.

According to another aspect of the present disclosure, a system for intra prediction is provided. The system may include at least one storage medium including a set of instructions for intra prediction, and at least one processor in communication with the storage medium. When executing the set of instructions, the at least one processor may perform the operations including: obtaining a current chroma block; obtaining a candidate list including a plurality of candidate chroma prediction modes for predicting samples of the current chroma block; and adjusting the candidate list based on luma information for predicting samples of a luma block associated with the current chroma block.

In some embodiments, the adjusting the candidate list includes: obtaining a plurality of luma prediction modes, wherein the plurality of luma prediction modes are prediction modes at a plurality of positions of the luma block associated with the current chroma block; selecting one or more alternative modes from the plurality of luma prediction modes; and replacing one or more candidate chroma prediction modes in the candidate list with the one or more alternative modes.

In some embodiments, the one or more candidate chroma prediction modes include a vertical mode, a horizontal mode, and a direct current (DC) mode.

In some embodiments, the one or more candidate chroma prediction modes include at least one of: a planar mode, a vertical mode, a horizontal mode, a direct current mode, a cross-component linear model prediction (LM) mode, an LM mode using left borders only (LM_L Mode), an LM mode using top borders only (LM_T Mode), and a derived mode (DM).

In some embodiments, the one or more alternative modes are different from the planar mode and the DM, and the one or more alternative modes are different from each other.

In some embodiments, the selecting the one or more alternative mode from the plurality of luma prediction modes includes: selecting the one or more alternative modes from the plurality of luma prediction modes according to a predetermined order rule.

In some embodiments, the selecting the one or more alternative modes according to the predetermined order rule includes: selecting one or more luma prediction modes at one or more positions of the luma block; and determining the one or more alternative modes based on a rank of the one or more luma prediction modes.

In some embodiments, the one or more luma prediction modes are ranked according to their positions with respect to a center of the luma block.

In some embodiments, the selecting the one or more alternative mode from the plurality of luma prediction modes includes: determining a count for each type of luma prediction modes of the plurality of luma prediction modes; and determining the one or more alternative mode based on the count of luma prediction modes of each type.

In some embodiments, the plurality of positions of the luma block includes a corner point of the luma block or a center point of a sub-block, wherein the center point of the luma block and the corner point of the luma block are two corner points of the sub-block.

In some embodiments, the at least one processor is further directed to perform operations including: determining a target chroma prediction mode from the candidate list after adjusting the candidate list.

In some embodiments, the determining the target chroma prediction mode includes: obtaining a first set of chroma prediction modes from the candidate list; for each chroma prediction mode in the first set, determining a first rate-distortion cost; and determining a second set of chroma prediction modes from the first set based on the first rate-distortion cost of each chroma prediction mode.

In some embodiments, the first set does not include the planar mode, the LM mode, or the DM mode.

In some embodiments, the at least one processor is further directed to perform operations including: for each chroma prediction mode in the second set, determining a second rate-distortion cost; and determining the target chroma prediction mode based on the second rate-distortion cost of each chroma prediction mode in the second set.

According to another aspect of the present disclosure, a method for intra prediction is provided. The method may include obtaining a current chroma block; obtaining a plurality of luma prediction modes, wherein the plurality of luma prediction modes includes prediction modes at a plurality of positions of a luma block associated with the current chroma block; and selecting a luma prediction mode from the plurality of luma prediction modes as a candidate chroma prediction mode for predicting samples of the current chroma block.

According to another aspect of the present disclosure, a method for intra prediction is provided. The method may include obtaining a current chroma block; obtaining a candidate list including a plurality of candidate chroma prediction modes for predicting samples of the current chroma block; and adjusting the candidate list based on luma information for predicting samples of a luma block associated with the current chroma block.

According to still another aspect of the present disclosure, a non-transitory computer-readable medium, comprising at least one set of instructions compatible for intra prediction is provided. When executed by at least one processor of an electrical device, the at least one set of instructions may direct the at least one processor to perform the following operations. The at least one processor may perform the operations including: obtaining a current chroma block; obtaining a plurality of luma prediction modes, wherein the plurality of luma prediction modes includes prediction modes at a plurality of positions of a luma block associated with the current chroma block; and selecting a luma prediction mode from the plurality of luma prediction modes as a candidate chroma prediction mode for predicting samples of the current chroma block.

According to still another aspect of the present disclosure, a non-transitory computer-readable medium, comprising at least one set of instructions compatible for intra prediction is provided. When executed by at least one processor of an electrical device, the at least one set of instructions may direct the at least one processor to perform the following operations. The at least one processor may perform the operations including: obtaining a current chroma block; obtaining a candidate list including a plurality of candidate chroma prediction modes for predicting samples of the current chroma block; and adjusting the candidate list based on luma information for predicting samples of a luma block associated with the current chroma block.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 11 is a flowchart illustrating an exemplary process for adjusting a candidate list according to some embodiments of the present disclosure;

DETAILED DESCRIPTION

Figure 1:
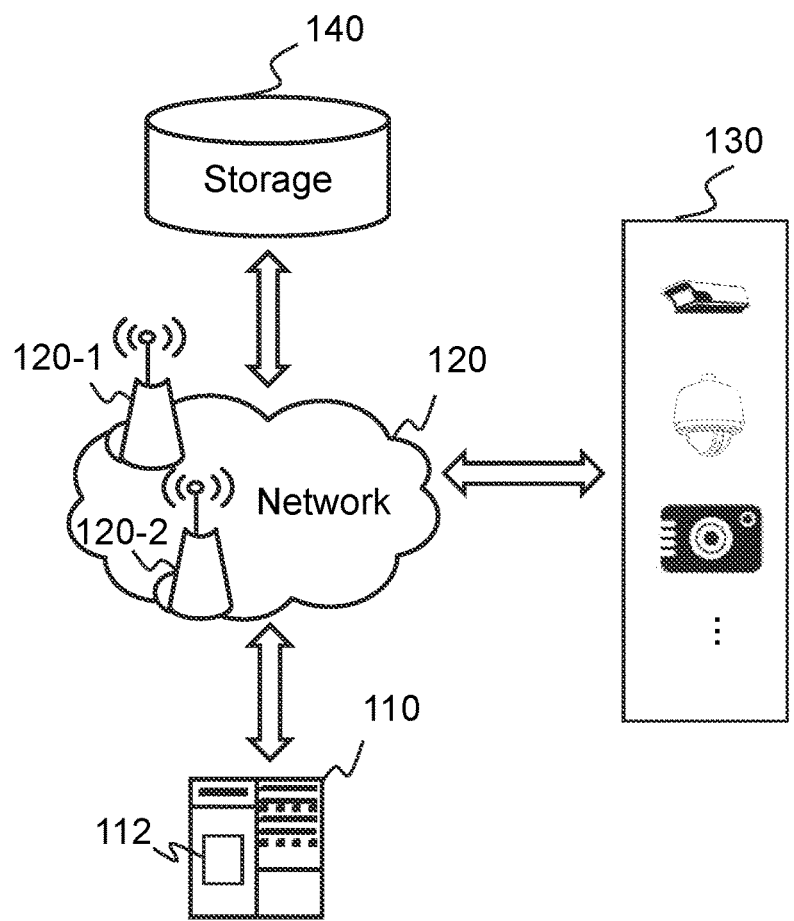
FIG. 1 is a schematic diagram illustrating an exemplary system for intra prediction according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) is for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for intra prediction. To this end, the systems and methods may select a representative luma prediction mode as a candidate chroma prediction mode for predicting samples (e.g., pixel values) of a current chroma block. The candidate chroma prediction mode may be a derived mode (DM). The representative luma prediction mode is selected from a plurality of luma prediction modes that are used for predicting samples at a plurality position of a luma block corresponding to the current chroma block by statistical methods. For example, a luma prediction mode type with a maximum count among the plurality of luma prediction modes at the plurality position may be the representative luma prediction mode. As another example, a luma prediction mode type with a maximum weight sum among the plurality of luma prediction modes may be the representative luma prediction mode. The weight sum of each luma prediction mode type may have a correlation with a distance between a center of the luma block and the corresponding position. The shorter between the center of the luma block and the corresponding position, the higher weight of the corresponding luma prediction mode. The systems and methods may also adjust a candidate list including a plurality of fixed chroma prediction modes. For example, the systems and methods may find out one or more representative luma prediction modes to replace one or more fixed chroma prediction modes in the candidate list. The one or more fixed chroma prediction modes may include a vertical mode, a horizontal mode, and a direct current (DC) mode.

FIG. 1 is a schematic diagram of an exemplary system 100 for intra prediction according to some embodiments of the present disclosure. The system 100 may include a server 110, a network 120, a camera 130, and a storage 140.

The server 110 may be configured to process information and/or data relating to intra prediction. For example, the server 110 may determine a candidate chroma prediction mode for predicting samples of the current chroma block. In some embodiments, the samples may refer to pixel values. As another example, the server 110 may adjust a candidate list including a plurality of candidate chroma prediction modes for predicting samples of the current chroma block. As still another example, the server 110 may determine one or more alternative modes and replace one or more candidate chroma prediction modes in the candidate list with the one or more alternative modes. In some embodiments, the server 110 may be a single server or a server group. The server group may be centralized, or distributed (e.g., the server 110 may be a distributed system). In some embodiments, the server 110 may be local or remote. For example, the server 110 may access information and/or data stored in the camera 130, and/or the storage 140 via the network 120. As another example, the server 110 may connect the camera 130, and/or the storage 140 to access stored information and/or data. In some embodiments, the server 110 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to intra prediction. For example, the processing engine 112 may determine a candidate chroma prediction mode for predicting samples of the current chroma block. As another example, the processing engine 112 may adjust a candidate list including a plurality of candidate chroma prediction modes for predicting samples of the current chroma block. As still another example, the processing engine 112 may determine one or more alternative modes and replace one or more candidate chroma prediction modes in the candidate list with the one or more alternative modes. In some embodiments, the processing engine 112 may include one or more processing engines (e.g., single-core processing engine(s) or multi-core processor(s)). Merely by way of example, the processing engine 112 may be one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set computer (RISC), a microprocessor, or the like, or any combination thereof.

The network 120 may facilitate the exchange of information and/or data. In some embodiments, one or more components of the system 100 (e.g., the server 110, the camera 130, and the storage 140) may transmit information and/or data to other component(s) in the system 100 via the network 120. For example, the server 110 may obtain a video from the camera 130 via the network 120. As another example, the server 110 may obtain a current chroma block and a plurality of luma prediction modes at a plurality of positions of a luma block associated with the current chroma block from the storage 140 via the network 120. In some embodiments, the network 120 may be any type of wired or wireless network, or combination thereof. Merely by way of example, the network 120 may be a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the system 100 may be connected to the network 120 to exchange data and/or information between them.

The camera 130 may be any electronic device that is capable of capturing images or videos. For example, the camera 130 may include an image sensor, a video recorder, or the like, or any combination thereof. In some embodiments, the camera 130 may include any suitable types of camera, such as a fixed camera, a fixed dome camera, a covert camera, a Pan-Tilt-Zoom (PTZ) camera, a thermal camera, or the like, or any combination thereof. In some embodiments, the camera 130 may further include at least one network port. The at least one network port may be configured to send information to and/or receive information from one or more components in the system 100 (e.g., the server 110, the storage 140) via the network 120. In some embodiments, the camera 130 may be implemented on a computing device 200 having one or more components illustrated in FIG. 2, or a mobile device 300 having one or more components illustrated in FIG. 3 in the present disclosure.

The storage 140 may store data and/or instructions. For example, the storage 140 may store data obtained from the camera 130 (e.g., video or images). As another example, the storage 140 may store a plurality of luma prediction modes at a plurality of positions of a luma block associated with the current chroma block. As still another example, the storage 140 may store data and/or instructions that the server 110 may execute or use to perform exemplary methods described in the present disclosure. In some embodiments, the storage 140 may be a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 140 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof.

In some embodiments, the storage 140 may include at least one network port to communicate with other devices in the system 100. For example, the storage 140 may be connected to the network 120 to communicate with one or more components of the system 100 (e.g., the server 110, the camera 130) via the at least one network port. One or more components in the system 100 may access the data or instructions stored in the storage 140 via the network 120. In some embodiments, the storage 140 may be directly connected to or communicate with one or more components in the system 100 (e.g., the server 110, the camera 130). In some embodiments, the storage 140 may be part of the server 110.

Figure 2:
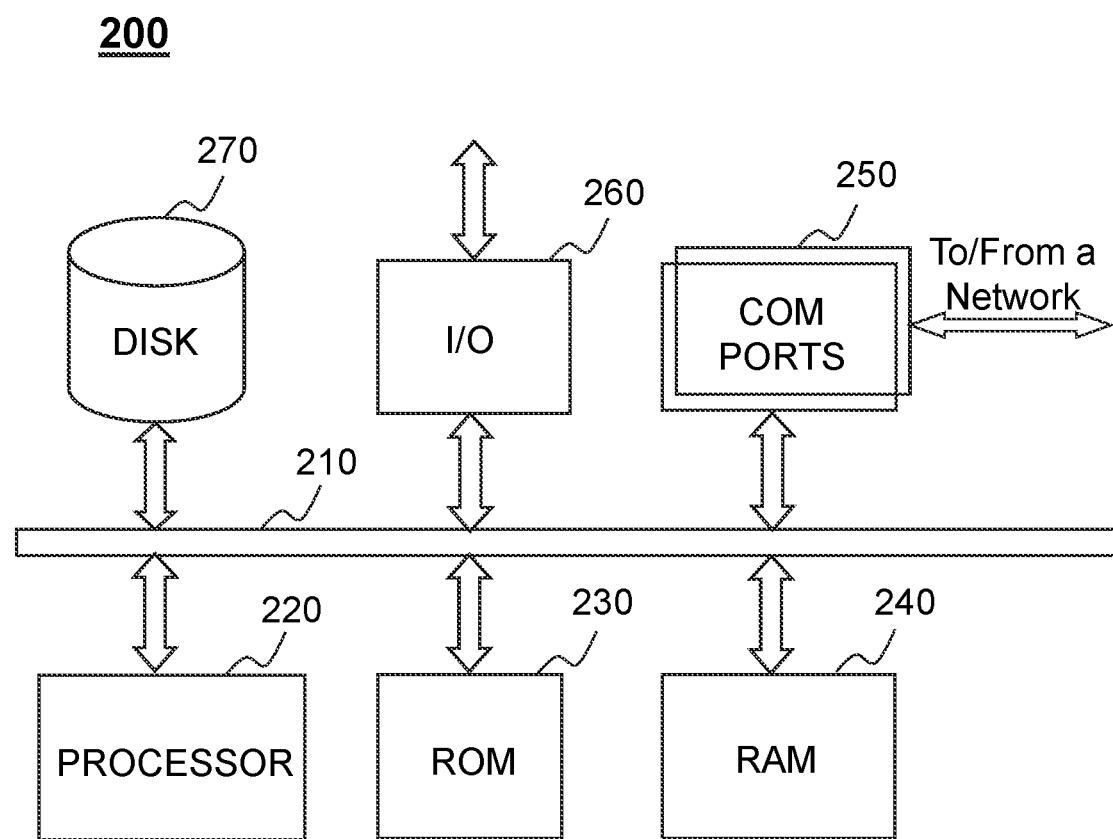
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the server 110, and/or the camera 130 may be implemented according to some embodiments of the present disclosure. For example, the processing engine 112 may be implemented on the computing device 200 and configured to perform functions of the processing engine 112 disclosed in this disclosure.

The computing device 200 may be used to implement a system 100 for the present disclosure. The computing device 200 may be used to implement any component of system 100 that performs one or more functions disclosed in the present disclosure. For example, the processing engine 112 may be implemented on the computing device 200, via its hardware, software program, firmware, or a combination thereof. Although only one such computer is shown, for convenience, the computer functions relating to the online to offline service as described herein may be implemented in a distributed fashion on a number of similar platforms, to distribute the processing load.

The computing device 200, for example, may include COM ports 250 connected to and from a network connected thereto to facilitate data communications. The COM port 250 may be any network port or data exchange port to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. The processing circuits may also generate electronic signals including the conclusion or the result and a triggering code. In some embodiments, the trigger code may be in a format recognizable by an operation system (or an application installed therein) of an electronic device (e.g., the camera 130) in the system 100. For example, the trigger code may be an instruction, a code, a mark, a symbol, or the like, or any combination thereof, that can activate certain functions and/or operations of a mobile phone or let the mobile phone execute a predetermined program(s). In some embodiments, the trigger code may be configured to rend the operation system (or the application) of the electronic device to generate a presentation of the conclusion or the result (e.g., a prediction result) on an interface of the electronic device. Then the interface circuits may send out the electronic signals from the processing circuits via the bus 210.

The exemplary computing device may include the internal communication bus 210, program storage and data storage of different forms including, for example, a disk 270, and a read-only memory (ROM) 230, or a random access memory (RAM) 240, for various data files to be processed and/or transmitted by the computing device. The exemplary computing device may also include program instructions stored in the ROM 230, RAM 240, and/or other types of non-transitory storage medium to be executed by the processor 220. The methods and/or processes of the present disclosure may be implemented as the program instructions. The exemplary computing device may also include operating systems stored in the ROM 230, RAM 240, and/or other types of non-transitory storage medium to be executed by the processor 220. The program instructions may be compatible with the operating systems for providing the online to offline service. The computing device 200 also includes an I/O component 260, supporting input/output between the computer and other components. The computing device 200 may also receive programming and data via network communications.

Merely for illustration, only one processor is illustrated in FIG. 2. Multiple processors are also contemplated; thus, operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
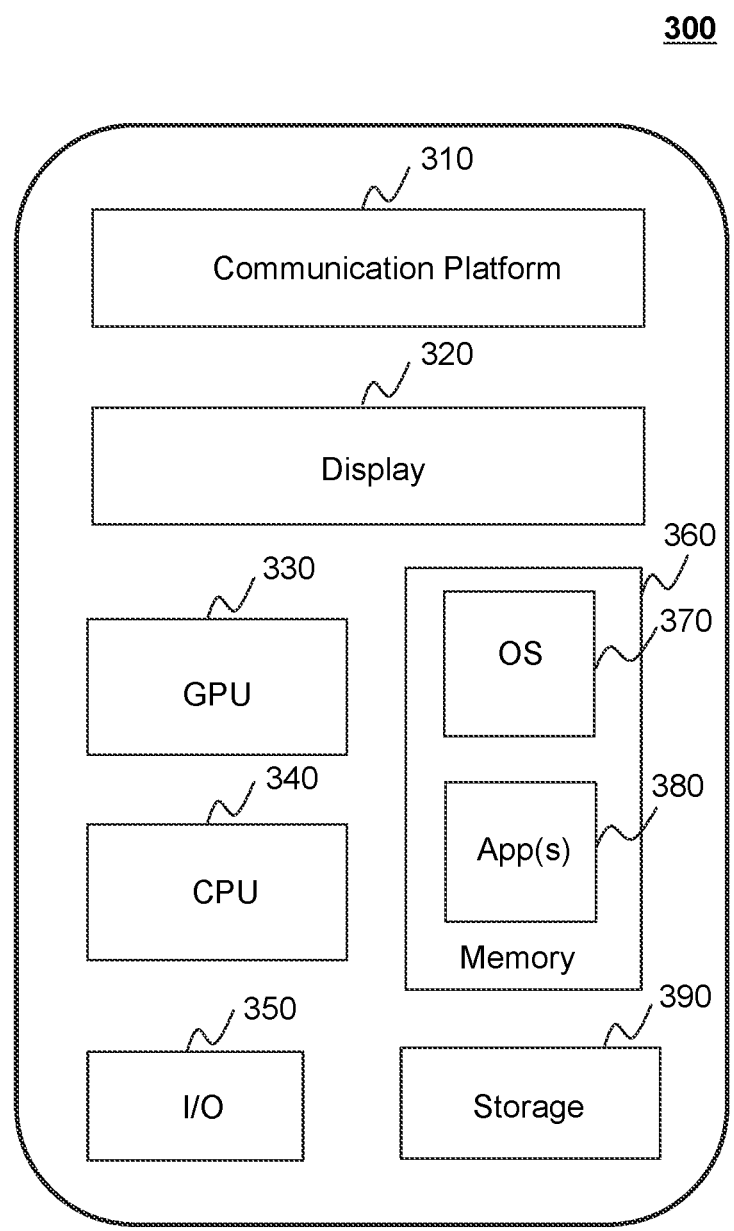
FIG. 3 is a schematic diagram illustrating exemplary hardware and/or software components of a mobile device according to some embodiments of the present disclosure.

FIG. 3 is a schematic diagram illustrating exemplary hardware and/or software components of an exemplary mobile device 300 on which the server 110 or the camera 130 may be implemented according to some embodiments of the present disclosure.

As illustrated in FIG. 3, the mobile device 300 may include a communication platform 310, a display 320, a graphics processing unit (GPU) 330, a central processing unit (CPU) 340, an I/O 350, a memory 360, and a storage 390. The CPU may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™ Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to the route planning service. User interactions with the information stream may be achieved via the I/O devices 350 and provided to the processing engine 112 and/or other components of the system 100 via the network 120.

To implement various modules, units, and their functionalities described in the present disclosure, computer hardware platforms may be used as the hardware platform(s) for one or more of the elements described herein (e.g., the system 100, and/or other components of the system 100 described with respect to FIGS. 1-14). The hardware elements, operating systems and programming languages of such computers are conventional in nature, and it is presumed that those skilled in the art are adequately familiar therewith to adapt those technologies to select the best facial image of the target human face as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 4:
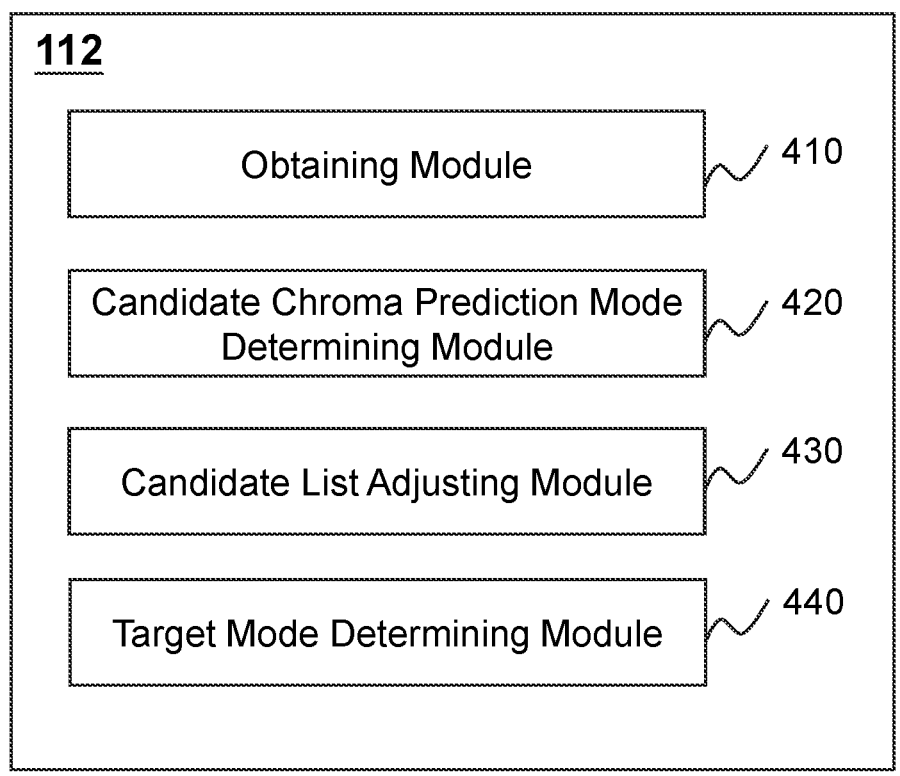
FIG. 4 is a block diagram illustrating an exemplary processing engine according to some embodiments of the present disclosure.

FIG. 4 is a block diagram illustrating an exemplary processing engine 112 according to some embodiments of the present disclosure. As illustrated in FIG. 4, the processing engine 112 may include an obtaining module 410, a candidate chroma prediction mode determining module 420, a candidate list adjusting module 430, and a target mode determining module 440.

The obtaining module 410 may be configured to obtain information relating to the intra prediction. For example, the obtaining module 410 may obtain a current chroma block. As another example, the obtaining module 410 may obtain a plurality of luma prediction modes at a plurality of positions of a luma block associated with the current chroma block. As still another example, the obtaining module 410 may obtain a candidate list including a plurality of candidate chroma prediction modes for predicting samples of the current chroma block.

The candidate chroma prediction mode determining module 420 may be configured to determine a candidate chroma prediction mode. For example, the candidate chroma prediction mode determining module 420 may select a luma prediction mode from the plurality of luma prediction modes as the candidate chroma prediction mode. As another example, the candidate chroma prediction mode determining module 420 may determine a count for each type of luma prediction modes of the plurality of luma prediction modes, and determine the candidate chroma prediction mode based on the count of luma prediction modes of each type. As still another example, the candidate chroma prediction mode determining module 420 may determine the candidate chroma prediction mode based on a weight of the luma prediction mode at each position or a weight sum of each mode type.

The candidate list adjusting module 430 may be configured to adjust the candidate list based on luma information for predicting samples of a luma block associated with the current chroma block. For example, the candidate list adjusting module 430 may determine one or more alternative modes, and replace one or more candidate chroma prediction modes in the candidate list with the one or more alternative modes.

The target mode determining module 440 may be configured to determine a target chroma prediction mode that can predict the samples of chroma block most accurately. For example, the target mode determining module 440 may determine a rate-distortion cost for a chroma prediction mode in the candidate list after being adjusted, and determine the target chroma prediction mode based on the rate-distortion cost.

The modules in the processing engine 112 may be connected to or communicate with each other via a wired connection or a wireless connection. The wired connection may be a metal cable, an optical cable, a hybrid cable, or the like, or any combination thereof. The wireless connection may be a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the candidate chroma prediction mode determining module 420 and the candidate list adjusting module 430 may be integrated as one module to both determine a candidate chroma prediction mode and adjusting the candidate list. As another example, the candidate list adjusting module 430 may include an alternative mode determining unit for determining one or more alternative modes and a replacing unit for replacing one or more candidate chroma prediction modes with the one or more alternative mode.

Figure 5:
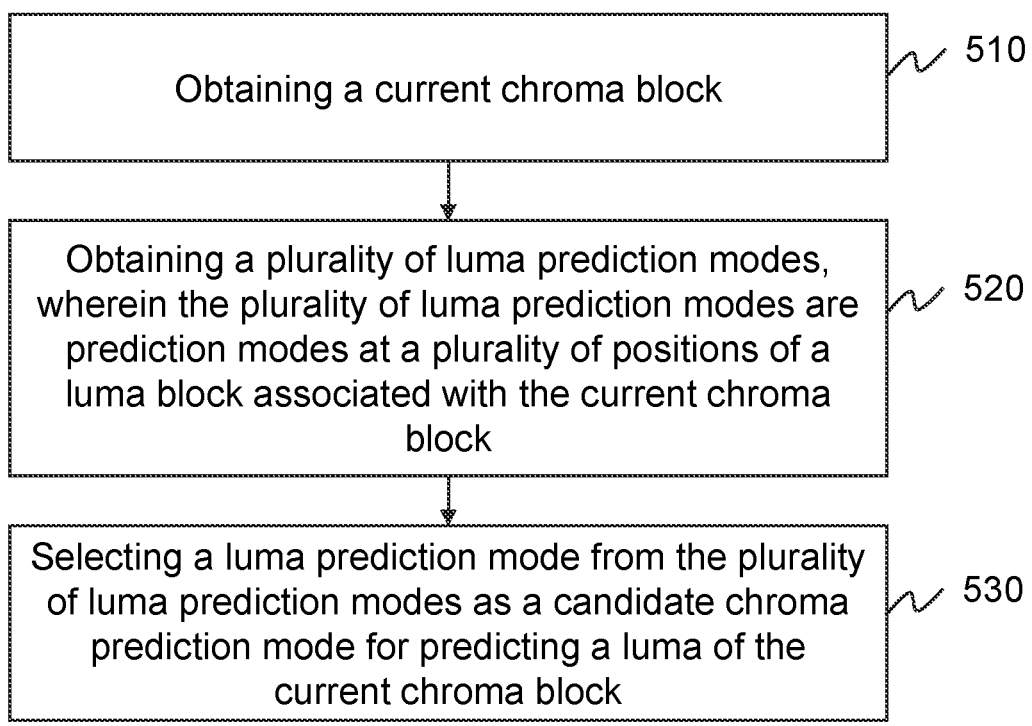
FIG. 5 is a flowchart illustrating an exemplary process for intra prediction according to some embodiments of the present disclosure.

FIG. 5 is a flowchart illustrating an exemplary process 500 for intra prediction according to some embodiments of the present disclosure. The process 500 may be executed by the system 100. For example, the process 500 may be implemented as a set of instructions (e.g., an application) stored in the storage ROM 230 or the RAM 240. The processor 220 may execute the set of instructions, and when executing the instructions, it may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5 and described below is not intended to be limiting.

In 510, the processing engine 112 (e.g., the processor 220, the obtaining module 410) may obtain a current chroma block.

In some embodiments, a current chroma block may be an area including a plurality of pixels in a frame of a video when encoding the frame. For example, the current chroma block may include a chroma code unit when encoding the frame according to a Luma and Chroma method (YUV). A chroma code unit may be a minimum independent encoding unit in a chroma block. In some embodiments, the current chroma block may be any shape. For example, the current chroma block may be circular, rectangular, square, or the like, or any combination thereof. In some embodiments, the processing engine 112 may encode the frame using the YUV method to obtain a plurality of chroma blocks and a plurality of luma blocks. In some embodiments, the luma code unit and the chroma code unit may be divided differently, so each of the plurality of chroma blocks may correspond to one or more luma block. The current chroma block may be one of the plurality of chroma blocks that is to be encoded.

In 520, the processing engine 112 (e.g., the processor 220, the obtaining module 410) may obtain a plurality of luma prediction modes.

In some embodiments, the plurality of luma prediction modes may include prediction modes at a plurality of positions of a luma block associated with the current chroma block. In some embodiments, one or more luma block may correspond to the current chroma block when encoding the frame using the YUV method. In some embodiments, the luma block may include a luma code unit. A luma code unit may be a minimum independent encoding unit in a luma block. In some embodiments, the luma block may be any shape. For example, the luma block may be circular, rectangular, square, or the like, or any combination thereof.

In some embodiments, before encoding the current chroma block, the luma block corresponding to the current chroma block has been encoded. The plurality of luma prediction modes at the plurality of positions the luma block may represent luma prediction modes that a luma code unit at each of the plurality of positions of the luma block used when being encoded.

Figure 6:
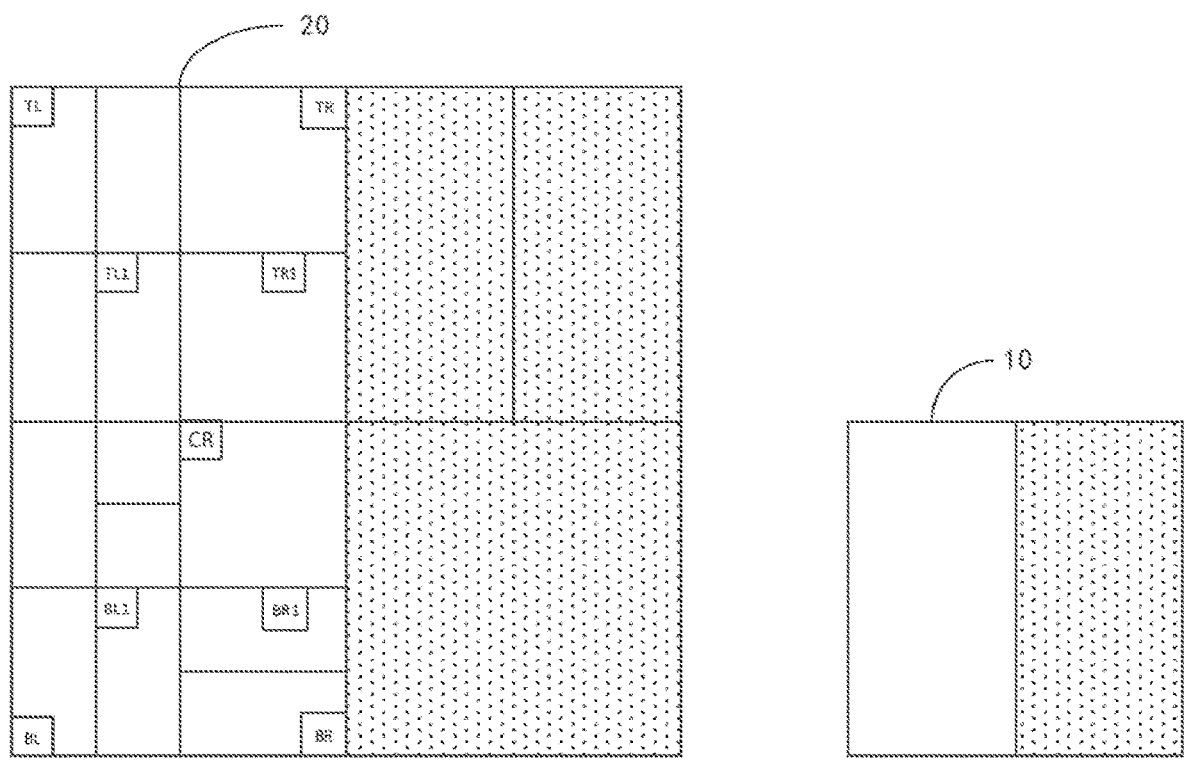
FIG. 6 is a schematic diagram illustrating an exemplary luma block and an exemplary chroma block according to some embodiments of the present disclosure.

FIG. 6 is a schematic diagram illustrating an exemplary luma block 20 and an exemplary chroma block 10 according to some embodiments of the present disclosure. In some embodiments, the luma block 20 and the chroma block 10 are obtained by encoding a same frame according to the YUV method. The luma block 20 is associated with (or corresponds to) the chroma block 10. As shown in FIG. 6, the luma block 20 and the chroma block 10 may be both rectangular. In some embodiments, during encoding the same frame according to the YUV method, a sampling rate of a Y component (a luminance component) and a sampling rate of a U component (a chrominance component) may be different. For example, due to the different sampling rates of the Y component and the U component, a size of the chroma block 10 may be different from that of the luma block 20. As shown in FIG. 6, the size of the chroma block 10 may be a quarter of that of the luma block 20. In some embodiments, the chroma block 10 may include a chroma code unit, and the luma block 20 may include a luma code unit. In some embodiments, different luma code units may be encoded independently, and have different luma prediction modes. The luma prediction modes at different positions of the luma block 20 may be all the same, all different, or some of the luma prediction modes are the same.

In some embodiments, the plurality of positions of the luma block may be any position of the luma block. For example, the plurality of positions may be evenly distributed on the luma block. For example, as shown in FIG. 6, the plurality of positions may include a center (CR) of the luma block 20, a corner point of the luma block 20, or a center point of a sub-block, or the like, or any combination thereof. In some embodiments, the corner point of the luma block 20 may include a top left corner point (TL), a top right corner point (TR), a bottom left corner point (BL), a bottom right corner point (BR), or the like, or any combination thereof. In some embodiments, a sub-block may be a part of the luma block 20. For example, the center point of the luma block 20 and the corner point of the luma block 20 may be two corner points of the sub-block. For example, as shown in FIG. 6, a center point TL1 may be a center point of a first sub-block with the center point (CR) of the luma block 20 and the top left corner point (TL) of the luma block 20 as a bottom right corner point and a top left corner of the first sub-block, respectively. As another example, a center point TR1 may be a center point of a second sub-block with the center point (CR) of the luma block 20 and the top right corner point (TR) of the luma block 20 as a bottom left corner point and a top right corner of the first sub-block, respectively. As still another example, a center point BL1 may be a center point of a third sub-block with the center point (CR) of the luma block 20 and the bottom left corner point (BL) of the luma block 20 as a top right corner point and a bottom left corner of the third sub-block, respectively. As still another example, a center point BR1 may be a center point of a fourth sub-block with the center point (CR) of the luma block 20 and the bottom right corner point (BR) of the luma block 20 as a top left corner point and a bottom right corner of the fourth sub-block, respectively. It should be noted that the positions described in FIG. 6 are only for illustration purposes, other positions on the luma block 20 may be selected.

In some embodiments, types of the plurality of luma prediction modes may include a planar mode, a vertical mode, a horizontal mode, a direct current (DC) mode or other angle prediction mode.

In some embodiments, after encoding the luma block 20, the luma prediction modes for predicting samples of each luma code unit at the plurality of positions may be stored in a storage device (e.g., the storage 140, the ROM 230 or the RAM 240, etc.). The processing engine 112 may access the storage device and obtain the plurality of luma prediction modes at the plurality of positions of the luma block 20 associated with the current chroma block 10. In some embodiments, the samples may refer to pixel values.

In 530, the processing engine 112 (e.g., the processor 220, the candidate chroma prediction mode determining module 420) may select a luma prediction mode from the plurality of luma prediction modes as a candidate chroma prediction mode for predicting samples of the current chroma block.

In some embodiments, the candidate chroma prediction mode may be a potential prediction mode used for predicting the samples of the current chroma block. For example, the candidate chroma prediction mode may be a prediction mode among a plurality of potential prediction modes in a candidate list. In some embodiments, the processing engine 112 may obtain the candidate list when predicting the samples of the current chroma block. The candidate list may be predetermined by the processing engine 112 or an operator thereof, and stored in a storage device (e.g., the storage 140, the ROM 230 or the RAM 240, etc.). For example, the candidate list may include a plurality of potential prediction modes, such as a planar mode, a vertical mode, a horizontal mode, a direct current mode, an LM mode, an LM_L Mode, an LM_T Mode, a DM mode, or the like, or any combination thereof.

In some embodiments, the processing engine 112 may select a representative luma prediction mode from the plurality of luma prediction modes as the candidate chroma prediction mode. For example, the luma prediction mode selected from the plurality of luma prediction modes may represent main texture features of the luma block corresponding to the current chroma block. In some embodiments, the luma prediction mode selected from the plurality of luma prediction modes may be a mode type that has a maximum count among the plurality of luma prediction modes. For example, the processing engine 112 may determine the mode type that has the maximum count as the DM mode. In some embodiments, the luma prediction mode selected from the plurality of luma prediction modes may be a mode type that has a maximum weight sum among the plurality of luma prediction modes. In some embodiments, the processing engine 112 may assign a weight for a luma prediction mode at each position. For example, the weight of the luma prediction mode at a position may a correlation with a distance between the position and a center of the luma block. As another example, the correlation may be a negative correlation. The shorter the distance between the position and the center of the luma block, the greater weight of the luma prediction mode at the position. The processing engine 112 may determine the weight sum of a luma prediction mode based on the corresponding weight correlated with the position and a count of the luma prediction mode appears in the plurality of luma prediction modes. In some embodiments, the method for determining the candidate chroma prediction mode may be found elsewhere in the present disclosure (e.g., FIGS. 7-9 and the descriptions thereof).

In some embodiments, texture features of the luma block and the corresponding chroma block may have a strong correlation. Thus, selecting a representative luma prediction mode from the plurality of luma prediction modes that used for predicting samples at the plurality of positions of the luma block corresponding to the current chroma block as the candidate chroma prediction mode may improve a probability to select a target chroma prediction mode from the candidate list. The target chroma prediction mode may predict the chroma of the current chroma block accurately.

It should be noted that the above description is merely provided for the purposes of illustration, and not intended to limit the scope of the present disclosure. For persons having ordinary skills in the art, multiple variations and modifications may be made under the teachings of the present disclosure. For example, operations 510 and 520 may be integrated into one step for obtaining the current chroma block and the plurality of luma prediction modes. As another example, a storage operation may be added after operation 530 for storing the candidate chroma prediction mode. However, those variations and modifications do not depart from the scope of the present disclosure.

Figure 7:
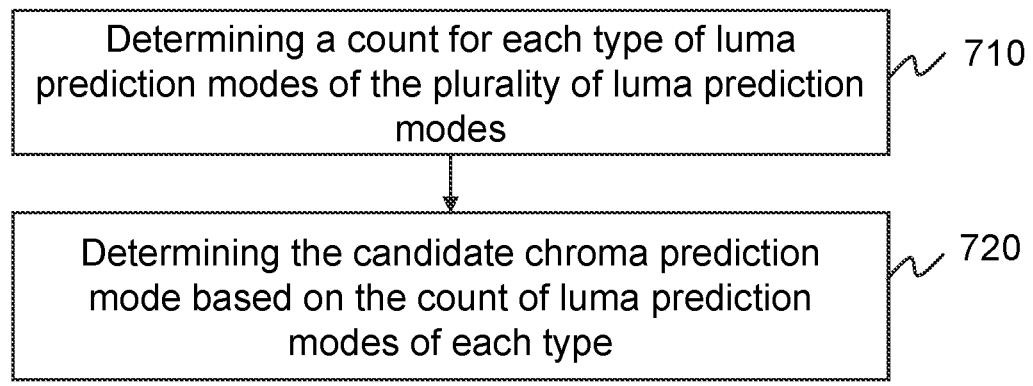
FIG. 7 is a flowchart illustrating an exemplary process for determining a candidate chroma prediction mode according to some embodiments of the present disclosure.

FIG. 7 is a flowchart illustrating an exemplary process 700 for determining a candidate chroma prediction mode according to some embodiments of the present disclosure. The process 700 may be executed by the system 100. For example, the process 700 may be implemented as a set of instructions (e.g., an application) stored in the storage ROM 230 or the RAM 240. The processor 220 may execute the set of instructions, and when executing the instructions, it may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting.

In 710, the processing engine 112 (e.g., the processor 220, the candidate chroma prediction mode determining module 420) may determine a count for each type of luma prediction modes of the plurality of luma prediction modes.

In some embodiments, the processing engine 112 may classify the plurality of luma prediction modes into a plurality of types. The plurality of types may include a planar mode, a vertical mode, a horizontal mode, a direct current mode, or the like, or any combination thereof. In some embodiments, the processing engine 112 may determine the count for each type. For example, the plurality of luma prediction modes may include five luma prediction modes at five positions (e.g., CR, TL, TR, BL, and BR as shown in FIG. 6). The luma prediction modes of CR, TL, and TR are all a first prediction mode type, and the luma prediction modes of BL and BR are both a second prediction mode type. The processing engine 112 may determine that the count of the first prediction mode type is 3, and the count of the second prediction mode type is 2.

In 720, the processing engine 112 (e.g., the processor 220, the candidate chroma prediction mode determining module 420) may determine the candidate chroma prediction mode based on the count of luma prediction modes of each type.

In some embodiments, the processing engine 112 may determine a type that has a maximum count among the plurality of luma prediction modes as the candidate chroma prediction mode. For example, the first prediction mode type has the maximum count among the five luma prediction modes at five positions. The processing engine 112 may determine the first prediction mode type as the candidate chroma prediction mode. In some embodiments, the processing engine 112 may determine whether the maximum count of a type satisfies a first predetermined condition. If the maximum count satisfies the first predetermined condition, the processing engine 112 may determine the corresponding type as the candidate chroma prediction mode. In some embodiments, the first predetermined condition may be predetermined by the processing engine 112 or the operator thereof, and stored in a storage device (e.g., the storage 140, the ROM 230 or the RAM 240, etc.). For example, the first predetermined condition may include that the maximum count is greater than a first count threshold. For example, the first count threshold is 2. The processing engine 112 may compare the maximum count (3) of the first prediction mode with the first count threshold (2). The maximum count is greater than the first count threshold. The processing engine 112 may determine the first prediction mode as the candidate chroma prediction mode. In some embodiments, the method for determining the candidate chroma prediction mode may be found elsewhere in the present disclosure (e.g., FIGS. 8-9 and the descriptions thereof).

In some embodiments, a count of a prediction mode may represent a frequency of occurrence that the prediction mode appears among the plurality of luma prediction modes when determining luminance of the luma block. The more frequency that a prediction mode type appears among the plurality of luma prediction modes, the more representative of the luma block that the prediction mode type may be.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 700.

Figure 8:
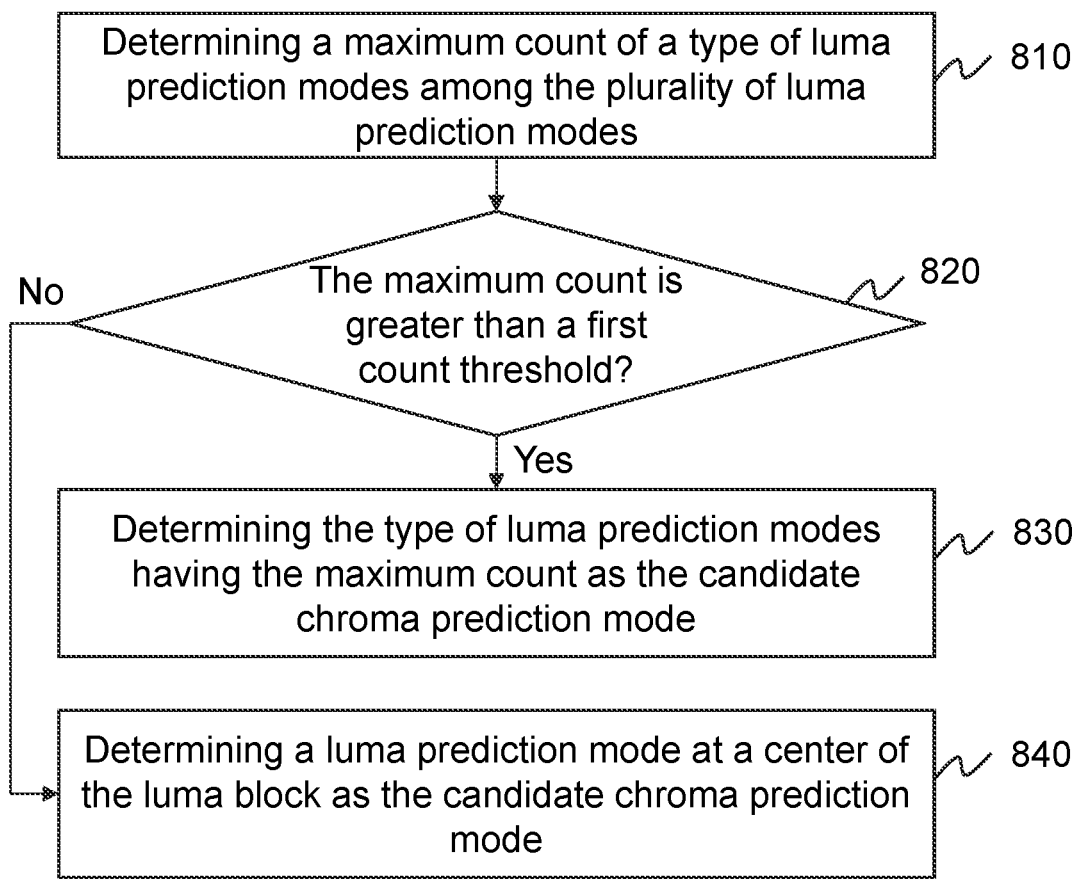
FIG. 8 is a flowchart illustrating an exemplary process for determining a candidate chroma prediction mode according to some embodiments of the present disclosure.

FIG. 8 is a flowchart illustrating an exemplary process 800 for determining a candidate chroma prediction mode according to some embodiments of the present disclosure. The process 800 may be executed by the system 100. For example, the process 800 may be implemented as a set of instructions (e.g., an application) stored in the storage ROM 230 or the RAM 240. The processor 220 may execute the set of instructions, and when executing the instructions, it may be configured to perform the process 800. The operations of the illustrated process presented below are intended to be illustrative. In some embodiments, the process 800 may be accomplished with one or more additional operations not described and/or without one or more of the operations discussed. Additionally, the order in which the operations of the process as illustrated in FIG. 8 and described below is not intended to be limiting.

In 810, the processing engine 112 (e.g., the processor 220, the candidate chroma prediction mode determining module 420) may determine a maximum count of a type of luma prediction modes among the plurality of luma prediction modes.

In some embodiments, the processing engine 112 may determine the count for each type, and determine the maximum count together with the type of luma prediction modes.

In 820, the processing engine 112 (e.g., the processor 220, the candidate chroma prediction mode determining module 420) may determine whether the maximum count is greater than a first count threshold.

In some embodiments, the processing engine 112 may compare the maximum count with the first count threshold. In some embodiments, the first count threshold may be condition to determine whether the luma prediction mode type having the maximum count is representative of the luma block or may reflect texture features of the luma block. In some embodiments, the first count threshold may be a default value stored in a storage device (e.g., the storage 140, the ROM 230 or the RAM 240, etc.). In some embodiments, the first count threshold may be determined according to different application scenarios. For example, the first count threshold may be determined according to a total count of the plurality of luma prediction modes. For example, if the total count of the plurality of luma prediction modes is 5, the first count threshold may be 2 or 3. As another example, if the plurality of luma prediction modes are luma prediction modes at 9 positions (e.g., CR, TL, TR, BL, BR, TL1, TR1, BL1, and BR1 as shown in FIG. 6), the total count of the plurality of luma prediction modes is 9, and the first count threshold may be 4, 5, 6, or 7.

In 830, in response to a determination that the maximum count is greater than the first count threshold, the processing engine 112 (e.g., the processor 220, the candidate chroma prediction mode determining module 420) may determine the type of luma prediction modes having the maximum count as the candidate chroma prediction mode.

In some embodiments, if the maximum count is greater than the first count threshold, the processing engine 112 may determine that the corresponding luma prediction mode type is representative of the luma block or the corresponding luma prediction mode type may reflect texture features of the luma block. The luma prediction mode type having the maximum count may be determined as the candidate chroma prediction mode.

In 840, in response to a determination that the maximum count is not greater than the first count threshold, the processing engine 112 (e.g., the processor 220, the candidate chroma prediction mode determining module 420) may determine a luma prediction mode at a center of the luma block as the candidate chroma prediction mode.

In some embodiments, if the maximum count is not greater than the first count threshold, the processing engine 112 may determine that the corresponding luma prediction mode type is not representative of the luma block or the corresponding luma prediction mode type may not reflect texture features of the luma block. The processing engine 112 may determine that the luma prediction mode at the center of the luma block is representative of the luma block or may reflect texture features of the luma block. The processing engine 112 may determine the luma prediction mode at the center of the luma block as the candidate chroma prediction mode.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 800.

Figure 9:
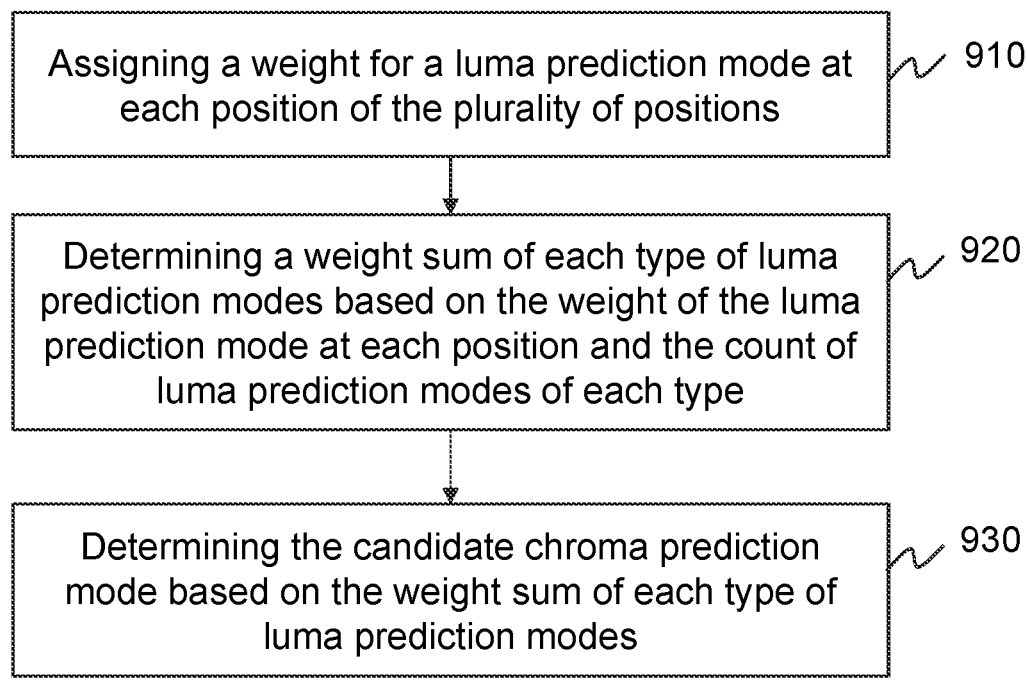
FIG. 9 is a flowchart illustrating an exemplary process for determining a candidate chroma prediction mode according to some embodiments of the present disclosure.

FIG. 9 is a flowchart illustrating an exemplary process 900 for determining a candidate chroma prediction mode according to some embodiments of the present disclosure. The process 900 may be executed by the system 100. For example, the process 900 may be implemented as a set of instructions (e.g., an application) stored in the storage ROM 230 or the RAM 240. The processor 220 may execute the set of instructions, and when executing the instructions, it may be configured to perform the process 900. The operations of the illustrated process presented below are intended to be illustrative. In some embodiments, the process 900 may be accomplished with one or more additional operations not described and/or without one or more of the operations discussed. Additionally, the order in which the operations of the process as illustrated in FIG. 9 and described below is not intended to be limiting.

In 910, the processing engine 112 (e.g., the processor 220, the candidate chroma prediction mode determining module 420) may assign a weight for a luma prediction mode at each position of the plurality of positions.

In some embodiments, the weight may reflect the importance of a position. For example, the weight of the luma prediction mode at a position may have a correlation with a distance between the position and a center of the luma block. In some embodiments, the correlation may be a negative correlation. For example, the shorter the distance the position and the center, the greater the weight of the corresponding luma prediction mode at the position.

In some embodiments, the processing engine 112 may assign the weight for the luma prediction mode at a position according to a method based on the distance. In some embodiments, the method may include a machine learning model trained by historical data, an algorithm summarized using experimental data, a table established using experimental data, or the like, or any combination thereof. For example, as shown in FIG. 6, the processing engine 112 may assign a first weight to the position CR, a second weight to each of the positions TL1, TR1, BL1, and BR1, a third weight to each of the positions TL, TR, BL, and BR. The first weight is greater than the second weight, and the second weight is greater than the third weight. Merely by way of examples, the first weight may be 4, the second weight may be 2, and the third weight may be 1.

In 920, the processing engine 112 (e.g., the processor 220, the candidate chroma prediction mode determining module 420) may determine a weight sum of each type of luma prediction modes based on the weight of the luma prediction mode at each position and the count of luma prediction modes of each type.

In some embodiments, the weight sum may be a value considering both the count of a type and the weight of the corresponding position. For example, as shown in FIG. 6, if the type of luma prediction modes at CR, TL, TR is a first prediction mode type, the type of luma prediction modes at BL and BR is a second prediction mode type, and the type of luma prediction modes at TL1, TR1, BL1, and BR1 is a third prediction mode type. The processing engine 112 may determine a weight sum of the first prediction mode type as $4+1+1=6$, a weight sum of the second prediction mode type as $1+1=2$, and a weight sum of the third prediction mode type as $2+2+2+2=8$.

In 930, the processing engine 112 (e.g., the processor 220, the candidate chroma prediction mode determining module 420) may determine the candidate chroma prediction mode based on the weight sum of each type of luma prediction modes.

In some embodiments, the processing engine 112 may determine a perdition mode having a maximum weight sum as the candidate chroma prediction mode. For example, the processing engine 112 may compare the weight sums of the first prediction mode type (6), the second prediction mode type (2), and the third prediction mode type (8). The third prediction mode type has the maximum weight sum. The processing engine 112 may determine the third prediction mode as the candidate chroma prediction mode. In some embodiments, the processing engine 112 may determine whether the maximum weight sum satisfies a second predetermined condition. If the maximum weight sum satisfies the second predetermined condition, the processing engine 112 may determine the corresponding type as the candidate chroma prediction mode. In some embodiments, the second predetermined condition may be predetermined by the processing engine 112 or the operator thereof, and stored in a storage device (e.g., the storage 140, the ROM 230 or the RAM 240, etc.). For example, the second predetermined condition may include that the maximum weight sum is greater than a sum threshold. The processing engine 112 may compare the maximum weight sum with the sum threshold. If the maximum weight sum is greater than the sum threshold, the processing engine 112 may determine the corresponding prediction mode type as the candidate chroma prediction mode. Otherwise, the processing engine 112 may determine a luma prediction mode at a center of the luma block as the candidate chroma prediction mode.

In some embodiments, determining the count of each prediction mode type and assigning a weight for each luma prediction mode at a position may find out a prediction mode type that generally reflects the texture features of the whole luma block. The probability of selecting a target chroma prediction mode from the candidate list may be improved. The target chroma prediction mode may predict the chroma of the current chroma block accurately.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 900.

Figure 10:
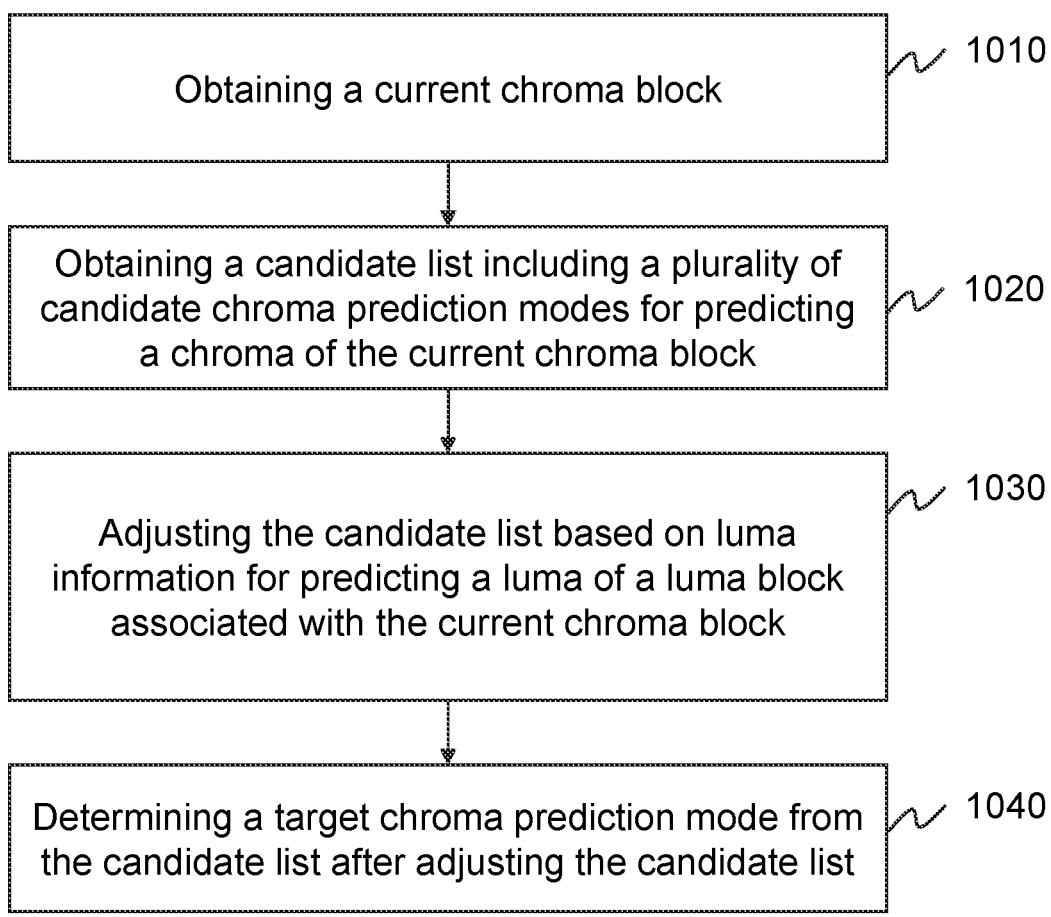
FIG. 10 is a flowchart illustrating an exemplary process for intra prediction according to some embodiments of the present disclosure.

FIG. 10 is a flowchart illustrating an exemplary process 1000 for intra prediction according to some embodiments of the present disclosure. The process 1000 may be executed by the system 100. For example, the process 1000 may be implemented as a set of instructions (e.g., an application) stored in the storage ROM 230 or the RAM 240. The processor 220 may execute the set of instructions, and when executing the instructions, it may be configured to perform the process 1000. The operations of the illustrated process presented below are intended to be illustrative. In some embodiments, the process 1000 may be accomplished with one or more additional operations not described and/or without one or more of the operations discussed. Additionally, the order in which the operations of the process as illustrated in FIG. 10 and described below is not intended to be limiting.

In 1010, the processing engine 112 (e.g., the processor 220, the obtaining module 410) may obtain a current chroma block.

In some embodiments, a current chroma block may be an area including a plurality of pixels in a frame of a video when encoding the frame. For example, the current chroma block may include a chroma code unit when encoding the frame according to a Luma and Chroma method (YUV). A chroma code unit may be a minimum independent encoding unit in a chroma block. In some embodiments, the current chroma block may be any shape. For example, the current chroma block may be circular, rectangular, square, or the like, or any combination thereof. In some embodiments, the processing engine 112 may encode the frame using the YUV method to obtain a plurality of chroma blocks and a plurality of luma blocks. In some embodiments, the luma code unit and the chroma code unit may be divided differently, so each of the plurality of chroma blocks may correspond to one or more luma block. The current chroma block may be one of the plurality of chroma blocks that is to be encoded.

In 1020, the processing engine 112 (e.g., the processor 220, the obtaining module 410) may obtain a candidate list including a plurality of candidate chroma prediction modes for predicting samples of the current chroma block.

In some embodiments, the candidate list may include a plurality of default candidate chroma prediction modes. For example, the plurality of candidate chroma prediction modes in the candidate list may include a planar mode, an angle mode, a direct current (DC) mode, an LM mode, an LM_L Mode, an LM_T Mode, a DM mode, or the like, or any combination thereof. In some embodiments, the planar mode, the DC mode, and the angle mode may be represented by a number. For example, the planar mode may be represented by 0, the DC mode may be represented by 1, and the angle mode may be represented by 2~N. In some embodiments, the angle mode may include a vertical mode and a horizontal mode. The vertical mode and the horizontal mode in different protocol standards may be represented by different numbers. For example, in H.265 standard, the angle mode may be represented by 2~34. The vertical mode and the horizontal mode may be represented by 10 and 26, respectively. As another example, in H. 266 standard, the angle mode may be represented by 2~66. The vertical mode and the horizontal mode may be represented by 18 and 50, respectively. In some embodiments, if the DM mode is the same as one of the planar mode, the vertical mode, the horizontal mode, or the DC mode, the corresponding same mode (e.g., the planar mode, the vertical mode, the horizontal mode, or the DC mode) may be replaced by an L mode. In some embodiments, the L mode may be a maximum number of an angle mode in the corresponding standard. For example, in H.265 standard, the L mode may be 34. As another example, in H.266 standard, the L mode may be 66. It should be noted that the plurality of candidate chroma prediction modes in the candidate list are only described for illustration purposes, the candidate list may include any other prediction modes.

In 1030, the processing engine 112 (e.g., the processor 220, the candidate list adjusting module 430) may adjust the candidate list based on luma information for predicting samples of a luma block associated with the current chroma block.

In some embodiments, the luma block may correspond to the current chroma block when encoding the frame using the YUV method. In some embodiments, the luma block may include a luma code unit. A luma code unit may be a minimum independent encoding unit in a luma block. In some embodiments, the luma block may be any shape. For example, the luma block may be circular, rectangular, square, or the like, or any combination thereof.

In some embodiments, before encoding the current chroma block, the luma block corresponding to the current chroma block has been encoded. The luma information for predicting the samples of the luma block may include information of a plurality of luma prediction modes at the plurality of positions the luma block. In some embodiments, the plurality of luma prediction modes at the plurality of positions the luma block may represent luma prediction modes that a luma code unit at each of the plurality of positions of the luma block used when being encoded. As shown in FIG. 6, the current chroma block 10 may correspond to the luma block 10.

In some embodiments, the processing engine 112 may adjust the candidate list using the plurality of luma prediction modes at the plurality of positions the luma block. For example, the processing engine 112 may select one or more luma prediction modes from the plurality of luma prediction modes at the plurality of positions the luma block of the corresponding luma block. The processing engine 112 may replace one or more candidate chroma prediction mode in the candidate list with the one or more selected luma prediction modes. In some embodiments, the processing engine 112 may only replace only one candidate chroma prediction mode in the candidate list. In some embodiments, the processing engine 112 may replace all of the candidate chroma prediction modes in the candidate list. In some embodiments, the processing engine 112 may replace only some of the candidate chroma prediction modes in the candidate list. In some embodiments, the processing engine 112 may replace one or more default candidate chroma prediction modes that have weak correlations with the texture features of the luma block. For example, the processing engine 112 may replace one or more of the vertical mode, the horizontal mode, or the DC mode in the candidate list. In some embodiments, the method for adjusting the candidate list may be found elsewhere (e.g., FIG. 11 and the descriptions thereof) in the present disclosure.

In 1040, the processing engine 112 (e.g., the processor 220, the target chroma prediction mode determining module 440) may determine a target chroma prediction mode from the adjusted candidate list.

In some embodiments, the processing engine 112 may select a best candidate chroma prediction mode that can predict the samples of chroma block most accurately from the adjusted candidate list as the target chroma prediction mode. In some embodiments, the target chroma prediction mode may be a prediction mode used for encoding the chroma block (or determining the samples of chroma block when encoding the chroma block). The target chroma prediction mode may predict the samples of chroma block most accurately.

In some embodiments, the processing engine 112 may calculate a rate-distortion cost for each of the candidate chroma prediction mode in the adjusted candidate list, and select a candidate chroma prediction mode that has the minimum rate-distortion cost as the target chroma prediction mode. In some embodiments, in order to reduce calculation, the processing engine 112 may roughly estimate rate-distortion costs of some candidate chroma prediction modes in the adjusted candidate list, and delete one or more candidate chroma prediction modes that have great rate-distortion costs. The processing engine 112 may then calculate a rate-distortion cost for each remaining candidate chroma prediction mode in the adjusted candidate list. In some embodiments, the method for determining the target chroma prediction mode may be found elsewhere (e.g., FIG. 14 and the descriptions thereof) in the present disclosure.

In some embodiments, adjusting the default candidate list of the current chroma block may improve correlations with the texture features of the corresponding luma block. The adjusted candidate list may reflect the texture features of the whole luma block. The predicted samples determined by the target chroma prediction mode may be more accurate and a residual sum and distortion of the video may be reduced. In addition, a compression rate of the video may be improved.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 1000.

FIG. 11 is a flowchart illustrating an exemplary process 1100 for adjusting a candidate list according to some embodiments of the present disclosure. The process 1100 may be executed by the system 100. For example, the process 1100 may be implemented as a set of instructions (e.g., an application) stored in the storage ROM 230 or the RAM 240. The processor 220 may execute the set of instructions, and when executing the instructions, it may be configured to perform the process 1100. The operations of the illustrated process presented below are intended to be illustrative. In some embodiments, the process 1100 may be accomplished with one or more additional operations not described and/or without one or more of the operations discussed. Additionally, the order in which the operations of the process as illustrated in FIG. 11 and described below is not intended to be limiting.

In 1110, the processing engine 112 (e.g., the processor 220, the candidate list adjusting module 430) may obtain a plurality of luma prediction modes. In some embodiments, the plurality of luma prediction modes may be prediction modes at a plurality of positions of a luma block associated with the current chroma block.

In some embodiments, the method for obtaining the plurality of luma prediction modes at the plurality of positions of the luma block associated with the current chroma block may be found elsewhere (e.g., FIG. 5 and the descriptions thereof) in the present disclosure.

In 1120, the processing engine 112 (e.g., the processor 220, the candidate list adjusting module 430) may select one or more alternative modes from the plurality of luma prediction modes.

In some embodiments, the processing engine 112 may select the one or more alternative modes according to a predetermined selecting rule. For example, if the adjusted candidate list includes the DM mode, the predetermined selecting rule may include that if the DM mode is not the planar mode, the one or more alternative modes may not include the planar mode and the DM mode. The predetermined selecting rule may also include that if the DM mode is the planar mode, the planar mode may be replaced by the L mode, and the one or more alternative modes may not include the DM mode. As another example, the predetermined selecting rule may include that the one or more alternative modes may be different from each other. As still another example, the predetermined selecting rule may include a predetermined order rule. In some embodiments, the method for determining the one or more alternative modes may be found elsewhere (e.g., FIGS. 12-13 and the descriptions thereof) in the present disclosure.

In 1130, the processing engine 112 (e.g., the processor 220, the candidate list adjusting module 430) may replace one or more candidate chroma prediction modes in the candidate list with the one or more alternative modes.

In some embodiments, the processing engine 112 may select the one or more candidate chroma prediction modes to be replaced. In some embodiments, the one or more candidate chroma prediction modes to be replaced may have weak correlations with the texture features of the luma block. For example, the one or more candidate chroma prediction modes to be replaced may include the vertical mode, the horizontal mode, the DC mode, or the like, or any combination thereof. As another example, the one or more candidate chroma prediction modes to be replaced may include the planar mode, the LM_L mode, the LM_T mode, or the like, or any combination thereof.

In some embodiments, the processing engine 112 may replace the one or more candidate chroma prediction modes in the candidate list with the one or more alternative modes according to a predetermined replacement rule. In some embodiments, the predetermined replacement rule may include that if the planar mode is replaced with the L mode, the L mode may not be replaced. In some embodiments, the predetermined replacement rule may include a replacement sequence. For example, the three candidate chroma prediction mode may be replaced according to a certain sequence of the vertical mode, the horizontal mode, and the DC mode. In some embodiments, the processing engine 112 may use three alternative modes to replace the vertical mode, the horizontal mode, and the DC mode in sequence. In some embodiments, the processing engine 112 may use one alternative mode to replace the vertical mode in sequence. In some embodiments, the processing engine 112 may use two alternative modes to replace the vertical mode and the horizontal mode in sequence. As another example, the three candidate chroma prediction mode may be replaced according to a random sequence.

In some embodiments, the predetermined replacement rule may include that if an alternative mode is the same as a candidate chroma prediction mode in the candidate list, the same candidate chroma prediction mode may not be replaced. For example, the processing engine 112 selects three alternative modes including a DC mode, an 8 mode, and a 4 mode to replace three candidate chroma prediction mode including the vertical mode, the horizontal mode, and the DC mode. Since the alternative DC mode is the same as the candidate chroma prediction DC mode, the DC mode in the candidate list may not be replaced, and the vertical mode and the horizontal mode in the candidate list may be replaced with the 8 mode and the 4 mode in sequence. As another example, the processing engine 112 selects three alternative modes including an 8 mode, a 4 mode, and an 11 mode to replace three candidate chroma prediction mode including the vertical mode, the horizontal mode, and the DC mode. Since the three alternative modes are different from the three candidate chroma prediction modes, the vertical mode, the horizontal mode, and the DC mode in the candidate list may be replaced with the 8 mode, the 4 mode, and the 11 mode in sequence. In some embodiments, if a count of the alternative modes is less than a count of the candidate chroma prediction modes, the processing engine 112 may replace the same count of candidate chroma prediction modes as the count of the alternative modes with all of the alternative modes, randomly or in sequence.

In some embodiments, the processing engine 112 may replace at least one candidate chroma prediction mode with at least one alternative mode. In this way, the candidate list may be optimized using the texture features of the luma block corresponding to the current chroma block. The predicted samples determined by the target chroma prediction mode may be more accurate and a residual sum and distortion of the video may be reduced. In addition, a compression rate of the video may be improved.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 1100.

Figure 12:
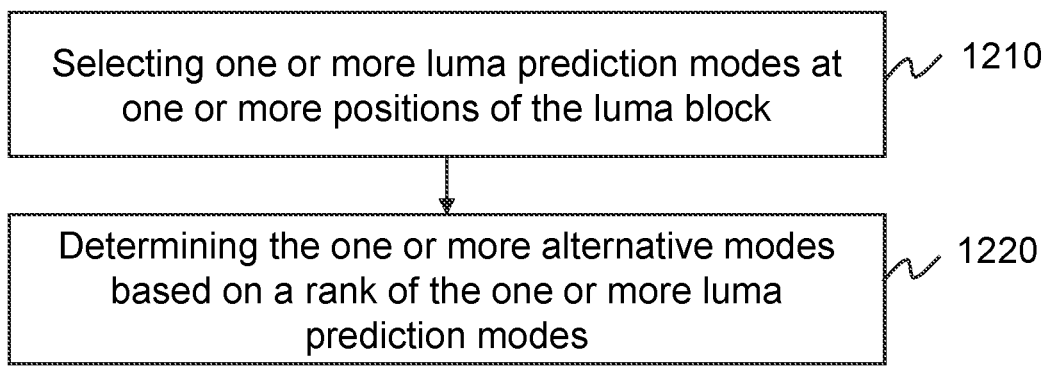
FIG. 12 is a flowchart illustrating an exemplary process for determining one or more alternative modes according to some embodiments of the present disclosure.

FIG. 12 is a flowchart illustrating an exemplary process 1200 for determining one or more alternative modes according to some embodiments of the present disclosure. The process 1200 may be executed by the system 100. For example, the process 1200 may be implemented as a set of instructions (e.g., an application) stored in the storage ROM 230 or the RAM 240. The processor 220 may execute the set of instructions, and when executing the instructions, it may be configured to perform the process 1200. The operations of the illustrated process presented below are intended to be illustrative. In some embodiments, the process 1200 may be accomplished with one or more additional operations not described and/or without one or more of the operations discussed. Additionally, the order in which the operations of the process as illustrated in FIG. 12 and described below is not intended to be limiting.

In 1210, the processing engine 112 (e.g., the processor 220, the candidate list adjusting module 430) may select one or more luma prediction modes at one or more positions of the luma block.

In some embodiments, the processing engine 112 may select the one or more luma prediction modes at one or more positions of the luma block according to an order rule. In some embodiments, the order rule may include selecting the one or more luma prediction mode according to their positions with respect to a center of the luma block. For example, the processing engine 112 may select the one or more luma prediction modes along directions from the center of the luma block to corner points of the luma block (from inside to outside of the luma block). In some embodiments, the order rule may include a rule from left to right of the luma block, a rule from top to bottom of the luma block, or the like, or any combination thereof.

In 1220, the processing engine 112 (e.g., the processor 220, the candidate list adjusting module 430) may determine the one or more alternative modes based on a rank of the one or more luma prediction modes.

In some embodiments, the processing engine 112 may rank the one or more luma prediction modes according to the order rule. For example, as shown in FIG. 6, eight luma prediction modes at eight positions (TL1, BL1, TR1, BR1, TL, BL, TR, and BR) of the luma block may be ranked by any one rank including:

I. TL1→BL1→TR1→BR1→TL→BL→TR→BR
II. TL1→TR1→BL1→BR1→TL→TR→BL→BR
III. TL1→TL→TR1→TR→BL1→BL→BR1→BR
IV. TL1→TL→BL1→BL→TR1→TR→BR1→BR
V. TL1→TL→TR1→TR→BL1→BR1→BL→BR
VI. TL1→BL1→TL→BL→TR1→BR1→TR→BR

In some embodiments, the processing engine 112 may select one or more luma prediction modes at top of a rank as the one or more alternative modes. For example, in the rank I above, the luma prediction modes corresponding to each position in the rank I may be a planar mode, a DC mode, a 3 mode, a 3 mode, a 4 mode, a 5 mode, a vertical mode, and a horizontal mode, respectively. According to the predetermined selecting rule, the planar mode may not be an alternative mode, and the alternative modes are different from each other. The processing engine 112 may determine three modes including the DC mode, the 3 mode, and the 4 mode as three alternative modes. As another example, the candidate list includes the planar mode, the vertical mode, the horizontal mode, the DC mode, the LM_L mode, the LM_T mode, the LM mode, and the DM mode. The processing engine 112 may replace the vertical mode, the horizontal mode, and the DC mode in the candidate list with the DC mode, the 3 mode, and the 4 mode. Since the alternative DC mode is the same as the candidate chroma prediction DC mode, the candidate chroma prediction DC mode may not be replaced. The candidate list may be adjusted after replacing. The adjusted candidate list may include the planar mode, the 3 mode, the 4 mode, the DC mode, the LM_L mode, the LM_T mode, the LM mode, and the DM mode.

In some embodiments, the processing engine 112 may rank the one or more luma prediction modes according to a count for each type of luma prediction modes. The method for determining the one or more alternative modes based on the count of each type of luma prediction modes may be found elsewhere (e.g., FIG. 13 and the descriptions thereof) in the present disclosure.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 1200.

Figure 13:
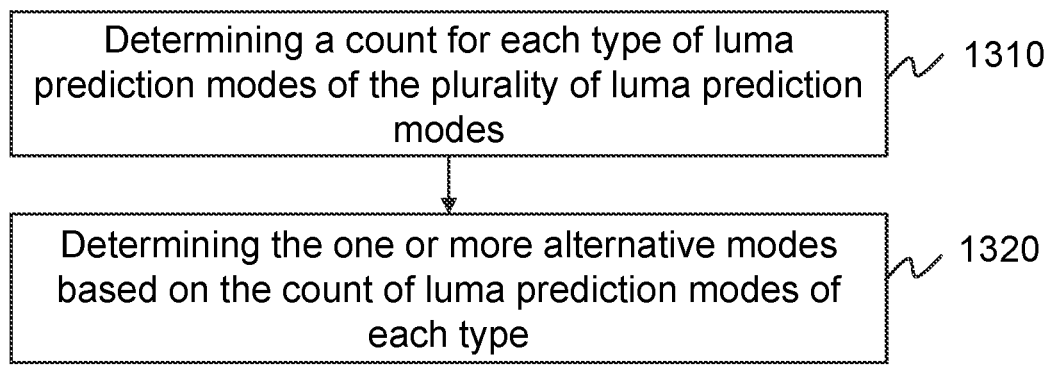
FIG. 13 is a flowchart illustrating an exemplary process for determining one or more alternative modes according to some embodiments of the present disclosure.

FIG. 13 is a flowchart illustrating an exemplary process 1300 for determining one or more alternative modes according to some embodiments of the present disclosure. The process 1300 may be executed by the system 100. For example, the process 1300 may be implemented as a set of instructions (e.g., an application) stored in the storage ROM 230 or the RAM 240. The processor 220 may execute the set of instructions, and when executing the instructions, it may be configured to perform the process 1300. The operations of the illustrated process presented below are intended to be illustrative. In some embodiments, the process 1300 may be accomplished with one or more additional operations not described and/or without one or more of the operations discussed. Additionally, the order in which the operations of the process as illustrated in FIG. 13 and described below is not intended to be limiting.

In 1310, the processing engine 112 (e.g., the processor 220, the candidate list adjusting module 430) may determine a count for each type of luma prediction modes of the plurality of luma prediction modes.

In some embodiments, the method for determining the count for each type of luma prediction modes may be found elsewhere (e.g., FIG. 7 and the descriptions thereof) in the present disclosure.

In 1320, the processing engine 112 (e.g., the processor 220, the candidate list adjusting module 430) may determine the one or more alternative mode based on the count of luma prediction modes of each type.

In some embodiments, the luma prediction modes at positions of TL1, BL1, TR1, BR1, TL, BL, TR, and BR may be the planar mode, the 3 mode, the 3 mode, the 4 mode, the 4 mode, the 4 mode, the 6 mode, and the DC mode, respectively. The count of the 3 mode is 2, the count of the 4 mode is 3, and the count of the 6 mode and the DC is 1, respectively. Since the planar mode may not be the alternative mode, the processing engine 112 may determine four alternative modes as the 4 mode, the 3 mode, the 6 mode, and the DC mode. For example, the candidate list may include the L mode, the vertical mode, the horizontal mode, the DC mode, the LM_L mode, the LM_T mode, the LM mode, and the DM mode. The processing engine 112 may replace one or more candidate chroma prediction modes in the candidate list with the 4 mode, the 3 mode, the 6 mode, and the DC mode randomly or according to the replacement rule. For example, since the alternative DC mode is the same as the candidate chroma prediction mode, the L mode, the vertical mode, and the horizontal mode in the candidate list may be replaced with the 4 mode, the 3 mode, the 6 mode, respectively. The candidate list after adjusting may include the 4 mode, the 3 mode, the 6 mode, the DC mode, the LM_L mode, the LM_T mode, the LM mode, and the DM mode. In some embodiments, the processing engine 112 may determine the one or more alternative modes based on a count threshold. For example, if a count of a mode type is greater than the count threshold, the processing engine 112 may determine the mode type as an alternative mode.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 1300.

Figure 14:
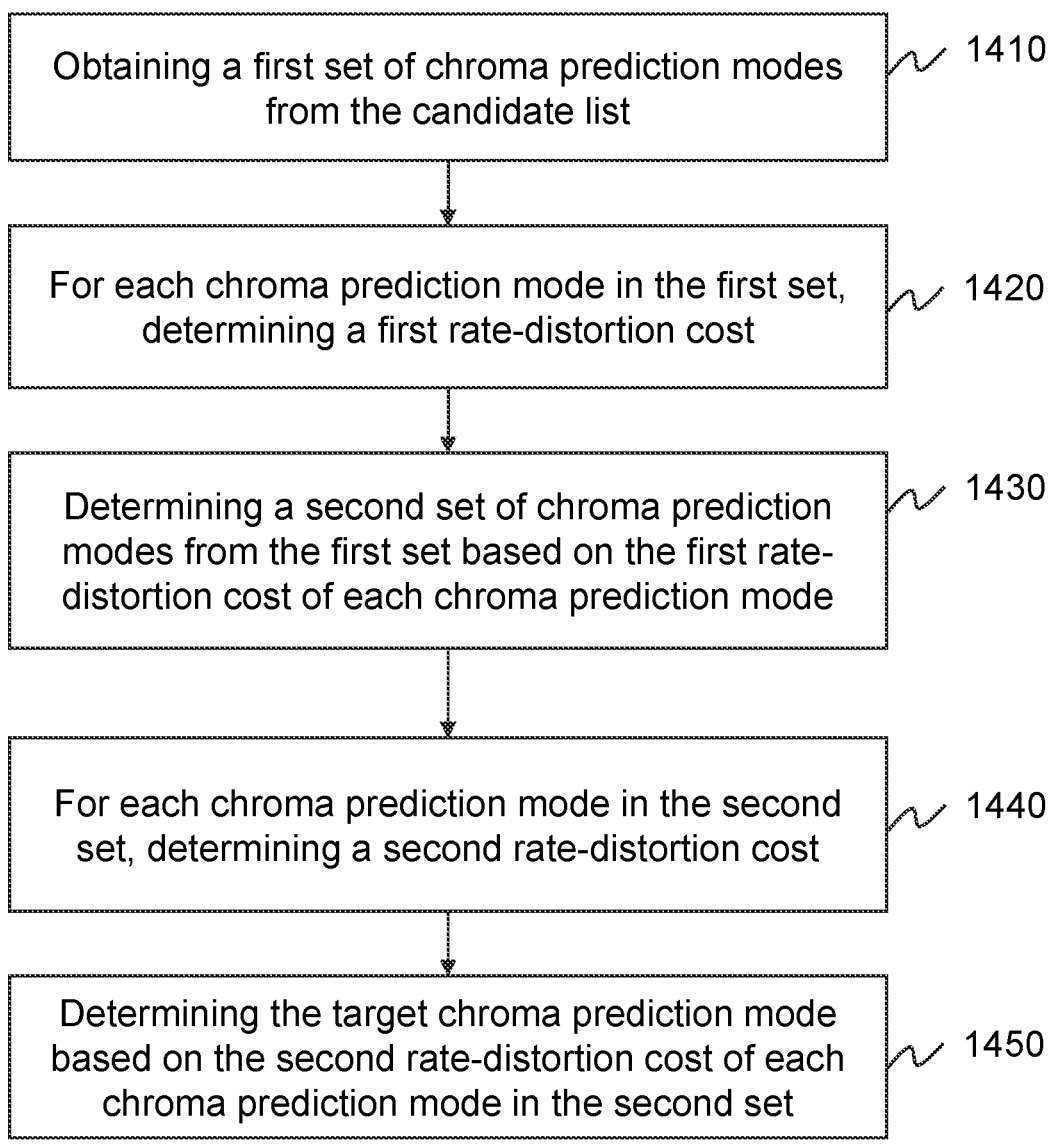
FIG. 14 is a flowchart illustrating an exemplary process for determining a target chroma prediction mode according to some embodiments of the present disclosure.

FIG. 14 is a flowchart illustrating an exemplary process 1400 for determining a target chroma prediction mode according to some embodiments of the present disclosure. The process 1400 may be executed by the system 100. For example, the process 1400 may be implemented as a set of instructions (e.g., an application) stored in the storage ROM 230 or the RAM 240. The processor 220 may execute the set of instructions, and when executing the instructions, it may be configured to perform the process 1400. The operations of the illustrated process presented below are intended to be illustrative. In some embodiments, the process 1400 may be accomplished with one or more additional operations not described and/or without one or more of the operations discussed. Additionally, the order in which the operations of the process as illustrated in FIG. 14 and described below is not intended to be limiting.

In 1410, the processing engine 112 (e.g., the processor 220, the target chroma prediction determining module 440) may obtain a first set of chroma prediction modes from the candidate list.

In some embodiments, the first set may include one or more chroma prediction modes in the candidate list after being adjusted. For example, the first set may be a subset of the candidate list. As another example, the candidate list after being adjusted may include the 4 mode, the 3 mode, the 6 mode, the DC mode, the LM_L mode, the LM_T mode, the LM mode, and the DM mode. In some embodiments, the first set may include the alternative modes. For example, the first set may include the 4 mode, the 3 mode, and the 6 mode. In some embodiments, the first set may include the alternative modes and one or more original prediction modes. For example, the first set may include the 4 mode, the 3 mode, the 6 mode, the LM_L mode, and the LM_T mode. In some embodiments, the first set may include one or more original prediction modes. For example, the first set may include the LM_L mode and the LM_T mode.

In 1420, the processing engine 112 (e.g., the processor 220, the target chroma prediction determining module 440) may determine a first rate-distortion cost for each chroma prediction mode in the first set.

In some embodiments, the first rate-distortion cost for a chroma prediction mode may reflect a difference between the original frame and a frame being reconstructed according to the corresponding chroma prediction mode. The greater the first rate-distortion cost, the greater the difference between the original frame and the reconstructed frame, and the less probability that the corresponding chroma prediction mode may be used as the target chroma prediction mode for determining the samples of the current chroma block.

In some embodiments, in order to reduce computation, the processing engine 112 may select some of the chroma prediction mode in the candidate list to determine the first rate-distortion for each chroma prediction mode, rather than determining the rate-distortion cost for each of the chroma prediction mode in the candidate list after being adjusted. In some embodiments, the first rate-distortion cost may be calculated according to a first algorithm. For example, the first algorithm may be a low complexity algorithm including a sum of absolute transformed difference (SATD) method, a sum of absolute differences (SAD) method, or the like, or any combination thereof.

In 1430, the processing engine 112 (e.g., the processor 220, the target chroma prediction determining module 440) may determine a second set of chroma prediction modes from the first set based on the first rate-distortion cost of each chroma prediction mode.

In some embodiments, the second set may be a subset of the first set. In some embodiments, the processing engine 112 may select one or more chroma prediction modes in the first set whose first rate-distortion cost satisfies a predetermined cost condition to form the second set. For example, the processing engine 112 may rank the candidate chroma prediction modes in the first set in a descending order of the first rate-distortion cost of each chroma prediction mode. One or more candidate chroma prediction modes whose first rate-distortion costs are less than a cost threshold in the first set may remain in the second set. For example, the cost threshold may be predetermined and stored in a storage device (e.g., the storage 140, the ROM 230 or the RAM 240, etc.).

In 1440, the processing engine 112 (e.g., the processor 220, the target chroma prediction determining module 440)

may determine a second rate-distortion cost for each chroma prediction mode in the second set.

In some embodiments, the second rate-distortion cost for a chroma prediction mode may reflect a difference between the original frame and a frame being reconstructed according to the corresponding chroma prediction mode. The greater the second rate-distortion cost, the greater the difference between the original frame and the reconstructed frame, and the less probability that the corresponding chroma prediction mode may be used as the target chroma prediction mode for determining the samples of the current chroma block. In some embodiments, the second rate-distortion cost may be calculated according to a second algorithm. For example, the second algorithm may be a high complexity algorithm including sum of squares for error (SSE) method, etc.

In 1450, the processing engine 112 (e.g., the processor 220, the target chroma prediction determining module 440) may determine the target chroma prediction mode based on the second rate-distortion cost of each chroma prediction mode in the second set.

In some embodiments, the processing engine 112 may determine the chroma prediction mode that has the minimum second rate-distortion cost in the second set as the target chroma prediction mode.

In some embodiments, extracting the first set from the candidate list to determine the first rate-distortion cost for each chroma prediction mode in the first set rather than determining the second rate-distortion cost for each chroma prediction mode in the candidate list may reduce computation and improve encoding speed.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 1400.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer-readable media having computer-readable program code embodied thereon.

A computer-readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

The invention claimed is:

1. A system for intra prediction, comprising:
    at least one storage medium including a set of instructions for intra prediction; and
    at least one processor in communication with the storage medium, wherein when executing the set of instructions, the at least one processor is directed to perform operations including:
        obtaining a current chroma block;
        obtaining a plurality of luma prediction modes, wherein the plurality of luma prediction modes includes prediction modes at a plurality of positions of a luma block associated with the current chroma block; and
        selecting a luma prediction mode from the plurality of luma prediction modes as a candidate chroma prediction mode for predicting samples of the current chroma block, wherein the selecting the luma prediction mode from the plurality of luma prediction modes as the candidate chroma prediction mode includes:
            determining a count for each type of luma prediction modes of the plurality of luma prediction modes;
            assigning a weight for a luma prediction mode at each position of the plurality of positions; and
            determining the candidate chroma prediction mode based on the count of luma prediction modes for each type and the weight for the luma prediction mode at each position.

2. The system of claim 1, wherein the candidate chroma prediction mode is a derived mode (DM).

3. The system of claim 1, wherein the at least one processor is further directed to perform operations including:
    determining a maximum count of a type of luma prediction modes among the plurality of luma prediction modes;
    determining whether the maximum count is greater than a first count threshold; and
    in response to a determination that the maximum count is greater than the first count threshold, determining the type of luma prediction modes having the maximum count as the candidate chroma prediction mode.

4. The system of claim 3, wherein the at least one processor is further directed to perform operations including:
    in response to a determination that the maximum count is not greater than the first count threshold, determining a luma prediction mode at a center of the luma block as the candidate chroma prediction mode.

5. The system of claim 1, wherein the at least one processor is further directed to perform operations including:
    determining a weight sum of each type of luma prediction modes based on the weight of the luma prediction mode at each position and the count of luma prediction modes of each type; and
    determining the candidate chroma prediction mode based on the weight sum of each type of luma prediction modes.

6. The system of claim 5, wherein the weight of the luma prediction mode at a position has a correlation with a distance between the position and a center of the luma block.

7. The system of claim 6, wherein the correlation is a negative correlation.

8. The system of claim 1, wherein the plurality of positions of the luma block include at least two of: a center of the luma block, a corner point of the luma block, or a center point of a sub-block, wherein the center point of the luma block and the corner point of the luma block are two corner points of the sub-block.

9. A system for intra prediction, comprising:
    at least one storage medium including a set of instructions for intra prediction; and
    at least one processor in communication with the storage medium, wherein when executing the set of instructions, the at least one processor is directed to perform operations including:
        obtaining a current chroma block;
        obtaining a candidate list including a plurality of candidate chroma prediction modes for predicting samples of the current chroma block, wherein a determination of the plurality of candidate chroma prediction modes includes:
- obtaining a plurality of luma prediction modes, the plurality of luma prediction modes including prediction modes at a plurality of positions of a luma block associated with the current chroma block; and
- selecting a luma prediction mode from the plurality of luma prediction modes as a candidate chroma prediction mode for predicting samples of the current chroma block, wherein the selecting the luma prediction mode from the plurality of luma prediction modes as the candidate chroma prediction mode includes:
  - determining a count for each type of luma prediction modes of the plurality of luma prediction modes;
  - assigning a weight for a luma prediction mode at each position of the plurality of positions; and
  - determining the candidate chroma prediction mode based on the count of luma prediction modes for each type and the weight for the luma prediction mode at each position; and
- adjusting the candidate list based on luma information for predicting samples of the luma block associated with the current chroma block.

10. The system of claim 9, wherein the adjusting the candidate list includes:
- selecting one or more alternative modes from the plurality of luma prediction modes; and
- replacing one or more candidate chroma prediction modes in the candidate list with the one or more alternative modes.

11. A method for intra prediction comprising:
obtaining a current chroma block;
obtaining a plurality of luma prediction modes, wherein the plurality of luma prediction modes includes prediction modes at a plurality of positions of a luma block associated with the current chroma block; and
selecting a luma prediction mode from the plurality of luma prediction modes as a candidate chroma prediction mode for predicting samples of the current chroma block, wherein the selecting the luma prediction mode from the plurality of luma prediction modes as the candidate chroma prediction mode includes:
- determining a count for each type of luma prediction modes of the plurality of luma prediction modes;
- assigning a weight for a luma prediction mode at each position of the plurality of positions; and
- determining the candidate chroma prediction mode based on the count of luma prediction modes for each type and the weight for the luma prediction mode at each position.

12. The method of claim 11, wherein the candidate chroma prediction mode is a derived mode (DM).

13. The method of claim 11, further comprising:
determining a maximum count of a type of luma prediction modes among the plurality of luma prediction modes;
determining whether the maximum count is greater than a first count threshold; and
in response to a determination that the maximum count is greater than the first count threshold, determining the type of luma prediction modes having the maximum count as the candidate chroma prediction mode.

14. The method of claim 13, further comprising:
in response to a determination that the maximum count is not greater than the first count threshold, determining a luma prediction mode at a center of the luma block as the candidate chroma prediction mode.

15. The method of claim 11, further comprising:
determining a weight sum of each type of luma prediction modes based on the weight of the luma prediction mode at each position and the count of luma prediction modes of each type; and
determining the candidate chroma prediction mode based on the weight sum of each type of luma prediction modes.

16. The method of claim 15, wherein the weight of the luma prediction mode at a position has a correlation with a distance between the position and a center of the luma block.

17. The method of claim 16, wherein the correlation is a negative correlation.

18. The method of claim 11, wherein the plurality of positions of the luma block include at least two of: a center of the luma block, a corner point of the luma block, or a center point of a sub-block, wherein the center point of the luma block and the corner point of the luma block are two corner points of the sub-block.

19. The system of claim 9, wherein the at least one processor is further directed to perform operations including:
- obtaining a first set of chroma prediction modes from the candidate list, wherein the first set does not include a planar mode, a LM mode, or a DM mode;
- for each chroma prediction mode in the first set, determining a first rate-distortion cost;
- determining, based on the first rate-distortion cost of the each chroma prediction mode in the first set, a second set of chroma prediction modes from the first set;
- for each chroma prediction mode in the second set, determining a second rate-distortion cost; and
- determining, based on the second rate-distortion cost of the each chroma prediction mode in the second set, a target chroma prediction mode for predicting samples of the current chroma block.

* * * * *